M. D. CHURCH.
SYSTEM OF ENGINE CONTROL.
APPLICATION FILED NOV. 8, 1919.
1,354,885.
Patented Oct. 5, 1920.
3 SHEETS—SHEET 1.
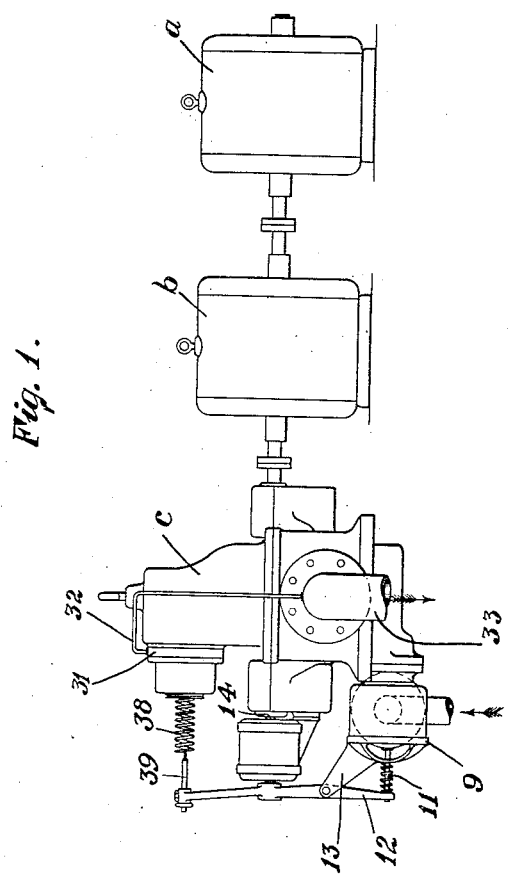
INVENTOR.
Maynard D. Church
BY
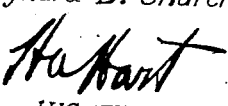
HIS ATTORNEY.

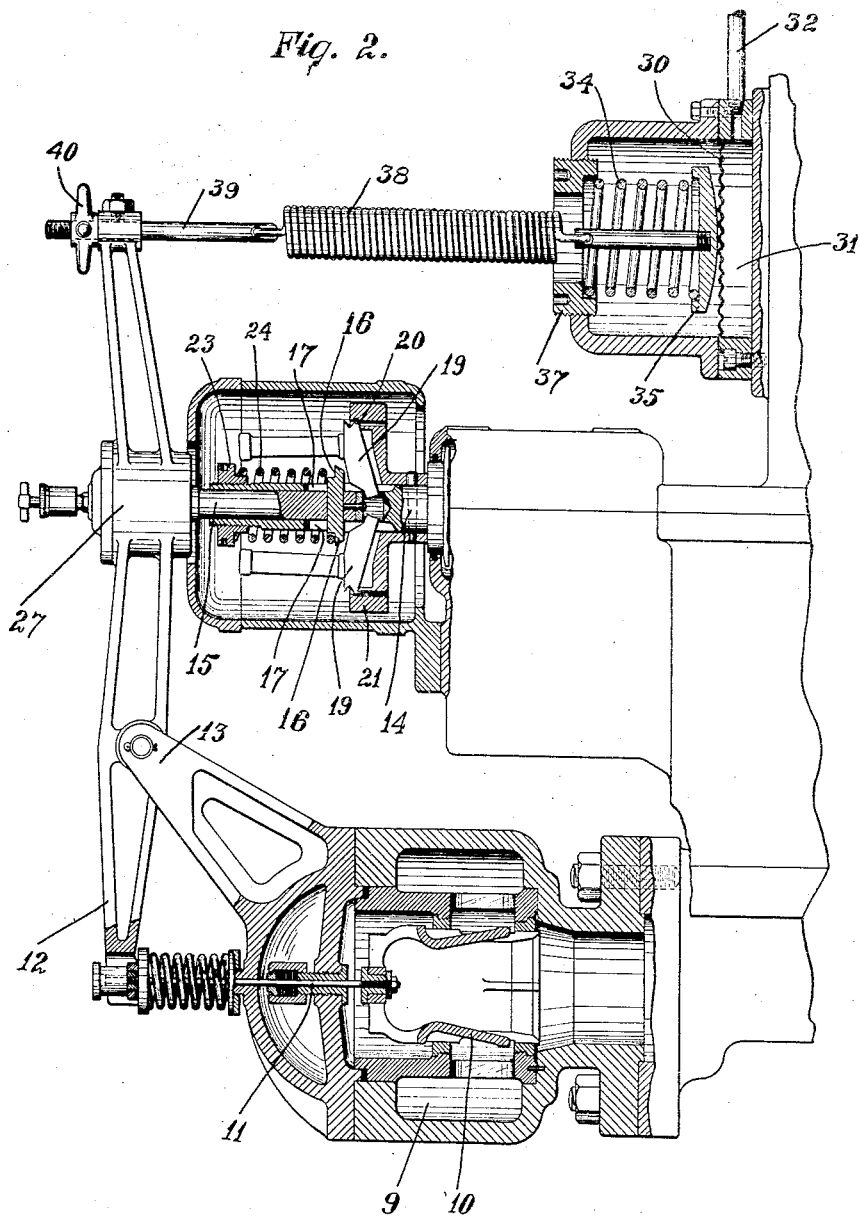

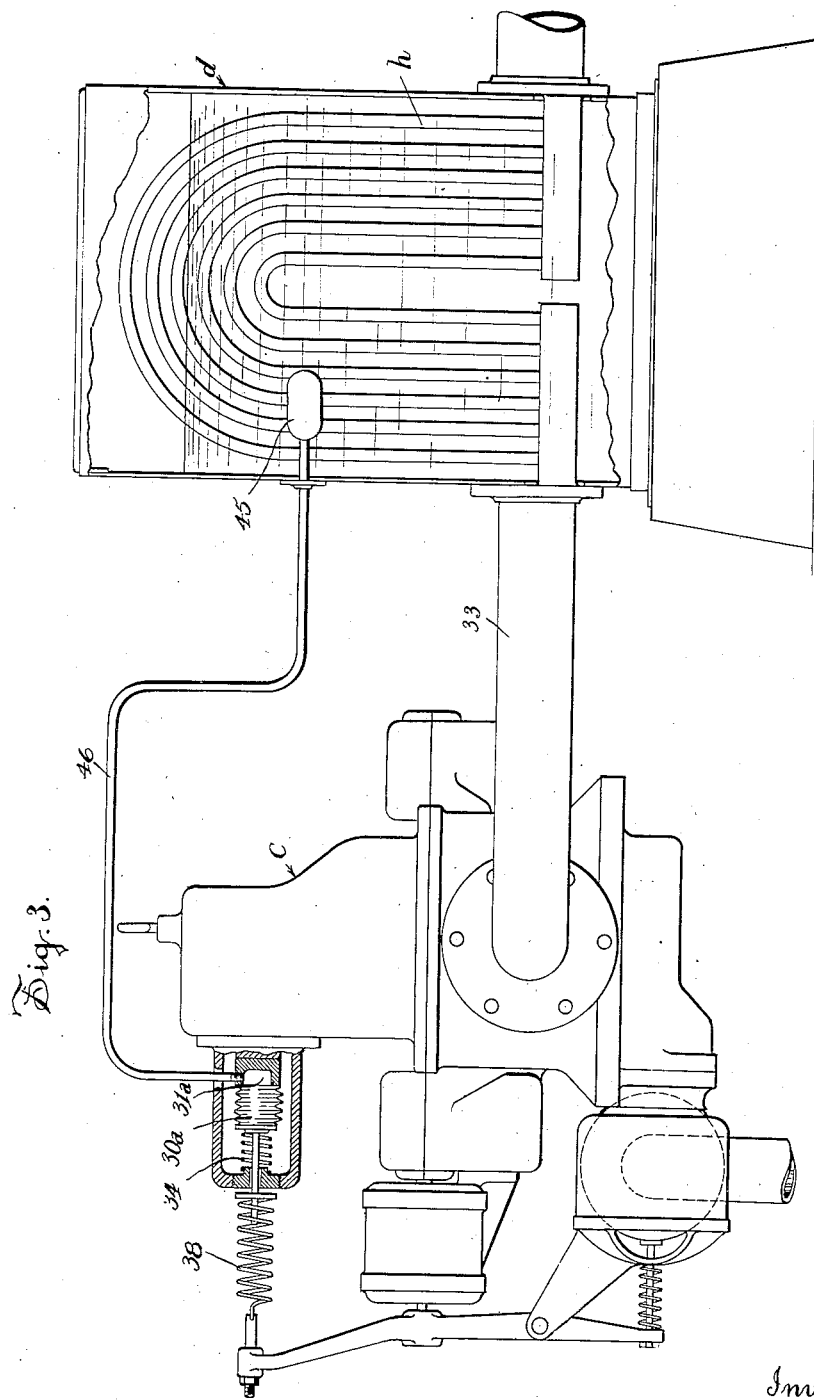

UNITED STATES PATENT OFFICE.

MAYNARD D. CHURCH, OF HARTFORD, CONNECTICUT, ASSIGNOR TO THE TERRY STEAM TURBINE COMPANY, OF HARTFORD, CONNECTICUT, A CORPORATION OF CONNECTICUT.

SYSTEM OF ENGINE CONTROL.

1,354,885.   Specification of Letters Patent.   Patented Oct. 5, 1920.

Application filed November 8, 1919. Serial No. 336,724.

*To all whom it may concern:*

Be it known that I, MAYNARD D. CHURCH, a citizen of the United States, and a resident of Hartford, county of Hartford, State of Connecticut, have invented certain new and useful Improvements in Systems of Engine Control, of which the following is a specification.

It is sometimes of advantage, from an economical standpoint, to employ the power of a steam engine, such as a steam turbine, for driving purposes and to use the low pressure steam from its exhaust for heating or other useful purposes and this is particularly the case in power systems wherein the power is furnished partly from a steam engine, such as the turbine, and partly from some other source, such as an electric motor. For example, an industrial plant may require 100 H. P. to drive its machinery but there may be a heating demand for low pressure steam varying from zero to a considerable quantity. If a motor drive using current from an outside source be used exclusively it will be necessary to generate steam for heating purposes only, although it would be far more economical to generate steam at a higher pressure and first use it in a turbine. If a turbine drive is used exclusively there will be many times when the exhaust steam will be partly or wholly wasted because there would be no use for it. By supplying the power partly by a steam engine and partly by a second driver, the load on the steam engine may be so adjusted that the exhaust steam will just meet the demand for low pressure steam.

In the present illustrative disclosure of my invention I have shown my improvements applied to a system wherein two drivers, such as a steam turbine and an electric motor, are employed to drive a driven member, such as a generator, but it is to be understood that the present disclosure is by way of illustration only as my invention may be employed generally in installations where it is permissible to vary the speed setting of the engine governor and thereby vary the load carried by the engine and the amount of steam passing through it. For example, the engine might drive an electric generator in parallel with other generators and would be caused to carry a greater or lesser part of the total electrical load according to the speed adjustment of the governor.

I am aware that in the so-called "duplex drive," a steam turbine and a motor are employed to drive an exciter or other driven machine and an arrangement is provided whereby the operator may manually adjust the load on the turbine when the exhaust steam from the turbine is to be employed for heating purposes but this arrangement is open to the objection that it is not automatic; the attendant must be relied upon to manually make such readjustments as are necessitated by constantly changing conditions.

I am further aware that it has been proposed, in installations of which steam engines form a part, to cause variations in exhaust pressure to actuate a throttle valve in the intake of the engine or turbine so as to control the quantity of steam admitted thereto, but in this arrangement, should the speed of the driven machine fall below the minimum required for satisfactory operation, the power of the turbine would be available to maintain speed only to the extent required to maintain the predetermined exhaust pressure, and therefore the turbine could not be depended on to keep the driven machine running within the permissible range of speed for successful operation.

In accordance with the present invention, variations in the relation between the amount of exhaust steam from the engine and the demand for exhaust steam automatically adjust the speed setting of the governor or other speed controlling device of the steam engine, so that the speed of the engine is such that just enough steam will be used by the engine to supply the demand for exhaust steam. The relation between the demand for exhaust steam and the supply thereof may be manifested or indicated by the temperature or the pressure of the exhaust steam itself or by the temperature or pressure of substances heated by the exhaust steam or otherwise.

The present arrangement is of advantage as the control is automatic and therefore the constant attention of an operator is not required, and furthermore when my invention is used in a duplex drive system, the steam engine is always ready to carry its full load at a slightly reduced speed in the event that the other driver or motor should fail, even if the exhaust pressure were high.

In the accompanying drawing:—

Figure 1 is a side view of an installation showing the application of one embodiment of the present invention.

Fig. 2 is a view in vertical section through the steam inlet valve together with its controlling means of the turbine shown in Fig. 1, and Fig. 3 is a side view of an arrangement illustrating another embodiment of the invention.

Referring to the drawings, a is the primary driver, such as an electric motor; b is a driven member, such as an exciter, and c is a steam engine, such as a turbine, all of which may be connected to the shaft of the generator so that when the motor drives the exciter it will also drive the rotor wheel of the turbine.

The steam engine c may be of any suitable kind, that shown in the drawings being a turbine of the well-known Terry type. It has a steam inlet passing from a boiler to the usual valve chamber 9, in which is located a valve 10 of the balanced type for controlling the supply of steam to the turbine. The valve 10 has a stem 11 to which is connected one end of a lever 12 pivoted between its ends on a bracket 13 fixed to the housing of the turbine. Carried by the main shaft 14 of the turbine is a speed regulator such as a centrifugal governor which may be of any desired construction. The governor shown in the drawings has a plunger 15 positioned in the outer counter-bored end of the shaft 14, and this plunger at its inner end has lugs 16 extending through and beyond slots 17 in the shaft 14 so that the plunger will rotate with the shaft but may move longitudinally thereof. Weighted L-shaped arms 19 are fulcrumed as at 20 on a disk 21 carried by the shaft 14 and the inner ends of these arms bear against the inner end of the plunger 15. Between an adjustable collar 23 on the outer end of the shaft 14 and the lugs 16 is a compression spring 24 which normally urges the plunger against the inner ends of the weighted arms 19. The outer end of the plunger 15 is operatively connected to the lever 12.

The foregoing construction which is old and well-known and forms no part of the present invention operates as follows: When the speed of rotation of the turbine shaft 14 increases, the outer ends of the arms 19 will swing away from each other thereby causing the inner ends of these arms to move the plunger 15 outwardly against the compression of the spring 24, the result being that the lever 12 is rocked in a direction to move the valve 10 toward its seat and reduce the amount of steam supplied to the turbine. When the speed of the shaft 14 is decreased, the centrifugal force upon the arms 19 becomes less so that the spring 24 will urge the plunger 15 inwardly and thereby cause the lever 12 to rock in a direction to further open the valve 10.

By my invention, the governor of the turbine is supplemented by mechanism responsive to variations in the supply of exhaust steam. This mechanism may be responsive to pressure (as illustrated in Figs. 1 and 2) or temperature changes (as illustrated in Fig. 3) or other change of condition resulting from or affected either directly or indirectly by variations in the relation between the quantity of exhaust steam from the turbine, and the demand for such steam. In Figs. 1 and 2 of the drawings I have shown this mechanism by way of illustration only as comprising a pressure responsive device of the type having a diaphragm 30, which forms one wall of a pressure chamber 31 communicating by means of a pipe 32 with the exhaust line 33 of the steam turbine so that as the pressure of the steam in the exhaust line rises and falls, the pressure within the chamber 31 will be correspondingly changed and the diaphragm 30 will be actuated. The diaphragm 30 is loaded with a compression spring 34, positioned between a head 35 engaging the diaphragm and an adjustable nut 37 carried by the frame of the regulator.

Movement of the diaphragm 30 is communicated to the lever 12 by means of a tension spring 38 connected at its inner end to the head 35, a rod 39 connecting the outer end of the spring with the upper end of the lever 12. The outer end of this rod 39 is threaded to receive a nut 40 which engages against the lever 12 so that the control may be manually adjusted. The control may also be regulated by adjusting the nut 37 to vary the load upon the diaphragm 30.

In operation, the regulator is first set by adjusting the nut 40 and the nut 37 so that the speed of the turbine will be maintained within predetermined limits. The compression force of the spring 34 is at all times greater than the tension in the spring 38 so that the spring 34 will maintain the head 35 against the diaphragm 30. During normal operation of the installation, the primary driver will take part of the load and the adjustment of the governor and the strength of the tension spring 38 are such that the turbine will drive the driven machine at a slightly reduced speed should the primary driver fail.

Upon change of pressure in the exhaust steam line of the turbine, the diaphragm 30 will move and the stress on the spring 38 is varied by this movement of the diaphragm and will therefore add to or subtract from the spring 24 of the governor a greater or less force depending upon the pressure working on the diaphragm. In the event that the pressure in the exhaust line of the turbine due to any cause drops, the diaphragm 30 under the force of the spring 34 will be moved inwardly and tend to extend the spring 38, and as the increased tension on the spring 38 is added to the force of the spring 24 of the main governor, the inlet valve 10 will be further opened and the speed of the turbine will increase causing the turbine to take on a greater load and use more steam and thereby increase the pressure in the exhaust line. If the exhaust line pressure increases the diaphragm 30 will move outwardly, the tension on the spring 38 is reduced and as this decreased tension in the spring 38 is subtracted from the force of the spring 24 of the main governor, the inlet valve will move toward its seat and the turbine will take less load and use less steam and thereupon the pressure in the exhaust line will become less.

In Fig. 3, I have illustrated an arrangement wherein a temperature responsive device affected by the quantity of steam passing through the turbine is employed to automatically control the speed of the turbine. In this figure, the exhaust steam line 33 of the turbine $c$ leads to a heater $h$ within a tank $d$ containing a substance the temperature of which is to be maintained within certain limits. The specific form of temperature responsive device, or other form of regulator, controlled by variations in temperature within the tank, is immaterial. For illustrative purposes, I have shown the temperature responsive device as being in the form of a bulb 45 containing a volatile liquid, such as ether, this bulb being located within the tank $d$ and being connected by means of a small tube 46 to a chamber 31$a$ of a pressure responsive device which is similar in construction to the regulator shown in Fig. 2, with the exception that instead of the flat corrugated diaphragm 30 a collapsible tube diaphragm 30$a$ is employed. As the temperature within the tank or heater $d$ rises, the volatile liquid in the bulb 45 develops an increasing vapor pressure which is transmitted through the tube 46 to the interior of the collapsible tube diaphragm 30$a$ resulting in the expansion of this collapsible tube diaphragm against the resistance of the spring 34, thereby decreasing the tension of the spring 38 and lowering the speed setting of the governor. As the temperature within the tank falls, the pressure within the bulb 45 and the chamber 31$a$ becomes less, resulting in raising the speed setting of the governor.

I claim as my invention:—

1. A steam engine, a governor therefor, and means actuated by variations in the relation of exhaust steam supply to the exhaust steam demand to adjust the speed setting of the governor.

2. In combination with a driven member capable of utilizing a greater or lesser amount of power, a steam engine driving that member, and a governor therefor, of means actuated by variations in the relation of exhaust steam supply to the exhaust steam demand to adjust the speed setting of the governor.

3. In combination with a driven member, a steam engine driving that member, and a governor therefor, of means actuated by variations in pressure affected by the relation of the exhaust steam supply from the engine to the demand therefor to adjust the speed setting of the governor.

4. In combination with a driven member, a steam engine driving that member, and a governor therefor, of pressure responsive means actuated by variations in pressure in the exhaust steam line to adjust speed setting of the governor.

5. In combination with a driven member, a steam engine driving that member, and a governor therefor, of means actuated by variations in the relation of the exhaust steam supply from the engine to the demand therefor to adjust the speed setting of the governor, and manually operable means to change the speed setting of the governor.

6. In combination with a driven member, a steam engine driving that member, and a governor therefor, of a spring associated with the governor, and means actuated by variations in the relation of the exhaust steam supply from the engine to the demand therefor to vary the force of said spring and thereby affect the speed setting of the governor.

7. In combination, a driven member, a steam engine, a governor therefor provided with a spring, an auxiliary spring supplementing the action of the governor spring, and means responsive to variations in the relation of the exhaust steam supply from the engine to the demand therefor to vary the force of the auxiliary spring and thereby affect the speed setting of the governor.

8. In combination with a driven member, a steam engine, and a second driver, all connected to rotate together when either the second driver or stem engine is driving, said steam engine having a governor, of means actuated by variations in the relation of the exhaust steam supply from the engine to the demand therefor to adjust the speed setting of said governor.

9. In combination with a driven member, a steam engine, and a second driver all connected together so as to rotate in unison when the second driver or steam engine is driving, said steam engine having a speed governor, of pressure responsive means actuated by variations in pressure in the steam exhaust line from the steam engine to adjust the speed setting of said governor.

MAYNARD D. CHURCH.